United States Patent
Bennedsen

(10) Patent No.: US 10,731,527 B2
(45) Date of Patent: Aug. 4, 2020

(54) LARGE SLOW-RUNNING TWO-STROKE ENGINE WITH SIP LUBRICANT INJECTOR

(71) Applicant: HANS JENSEN LUBRICATORS A/S, Hadsund (DK)

(72) Inventor: Nick Paw Bennedsen, Hadsund (DK)

(73) Assignee: HANS JENSEN LUBRICATORS A/S (DK)

( * ) Notice: Subject to any disclaimer, the term of this patent is extended or adjusted under 35 U.S.C. 154(b) by 20 days.

(21) Appl. No.: 15/770,903

(22) PCT Filed: Oct. 28, 2015

(86) PCT No.: PCT/DK2015/050329
§ 371 (c)(1),
(2) Date: Apr. 25, 2018

(87) PCT Pub. No.: WO2017/071706
PCT Pub. Date: May 4, 2017

(65) Prior Publication Data
US 2018/0313239 A1    Nov. 1, 2018

(51) Int. Cl.
*F01M 1/08* (2006.01)
*F01M 11/02* (2006.01)
(Continued)

(52) U.S. Cl.
CPC .............. *F01M 1/08* (2013.01); *F01M 11/02* (2013.01); *F02F 1/20* (2013.01); *F16N 7/38* (2013.01);
(Continued)

(58) Field of Classification Search
CPC .............. F01M 1/08; F01M 2001/083; F01M 2011/022; F01M 11/02; F02F 1/20; F16N 7/38
See application file for complete search history.

(56) References Cited

U.S. PATENT DOCUMENTS

| 2004/0026174 A1* | 2/2004 | Lauritsen ................. F01M 1/08 |
| | | 184/6.8 |
| 2014/0109862 A1* | 4/2014 | Straub ....................... F02F 1/20 |
| | | 123/193.6 |

FOREIGN PATENT DOCUMENTS

| CN | 103890330 A | 6/2015 | |
| EP | 0299174 A1 * | 1/1989 | ............... F01M 1/08 |

(Continued)

OTHER PUBLICATIONS

International Search Report—PCT/DK2015/050329.
(Continued)

*Primary Examiner* — Jacob M Amick
(74) *Attorney, Agent, or Firm* — Schmeiser, Olsen & Watts, LLP

(57) ABSTRACT

Disclosed is lubrication for a slow-running two-stroke engine, especially marine diesel engines. The lubrication uses Swirl Injection Principle by locating the lubricant injectors closer to the TDC than ⅕ of the full stroke of the piston, which is closer than in typical marine diesel engines. This can be achieved by reconstructing cylinder liners or by adding new mounting holes to the cylinder. In case that such reconstruction is not possible, an improvement of SIP principles can also be achieved by directing the spray towards the TDC or to a location on the cylinder liner closer to the TDC as compared to the location of the SIP valves, for example under an angle of more than 30 degrees or even more than 60 degrees when measured from a plane normal to the cylinder axis.

16 Claims, 5 Drawing Sheets

(51) Int. Cl.
*F01M 1/20* (2006.01)
*F02F 1/20* (2006.01)
*F16N 7/38* (2006.01)

(52) U.S. Cl.
CPC . *F01M 2001/083* (2013.01); *F01M 2011/022* (2013.01)

(56) References Cited

FOREIGN PATENT DOCUMENTS

| | | |
|---|---|---|
| EP | 0299174 | 12/1989 |
| EP | 1350929 A1 | 10/2003 |
| EP | 2686527 A2 | 1/2014 |
| EP | 2689113 A1 | 1/2014 |
| EP | 2722500 A2 | 4/2014 |
| EP | 2900947 A1 | 8/2015 |
| JP | S5194342 A | 8/1976 |
| JP | S6082524 U | 6/1985 |
| JP | S60122550 A | 7/1985 |
| JP | 61-279 716 | 12/1986 |
| JP | 2003286816 A | 10/2003 |
| JP | 2014511961 A | 5/2014 |
| JP | 2015-21429 | 2/2015 |
| JP | 2015165104 A | 9/2015 |
| JP | 2015529303 A | 10/2015 |
| WO | WO0235068 A1 | 5/2002 |
| WO | WO2004038189 A1 | 5/2004 |
| WO | WO2004038189 A1 | 5/2004 |
| WO | WO 2005124112 A1 | 12/2005 |
| WO | WO2006089558 A1 | 8/2006 |
| WO | WO2010149162 A1 | 12/2010 |
| WO | WO2012126473 A2 | 9/2012 |
| WO | WO 2012126480 | 9/2012 |
| WO | WO-2012126480 A1 * | 9/2012 ............... F01M 1/08 |
| WO | WO2014048438 | 4/2014 |
| WO | WO 2014162143 | 10/2014 |
| WO | WO2015129641 A1 | 9/2015 |

OTHER PUBLICATIONS

Written Opinion—PCT/DK2015/050329.
International Preliminary Report on Patentability—PCT/DK2015/050329.
Sven Lauritsen—Swirl Injection Lubrication—A New Technology to Obtain Low Cylinder Oil Consumption Without Sacrificing Wear Rates; International Council on Combustion Engines, Congress 2001.
Non-English Chinese Office Action dated Sep. 17, 2019 for Application No. 2015800841705.
Non-English Japanese Office Action dated Dec. 2, 2019 for Application No. 2018522086.

* cited by examiner

LARGE SLOW-RUNNING TWO-STROKE ENGINE WITH SIP LUBRICANT INJECTOR

CROSS-REFERENCE TO RELATED APPLICATIONS

This application claims priority to PCT Application No. PCT/DK2015/050329 having a filing date of Oct. 28, 2015, the entire contents of which is hereby incorporated by reference.

FIELD OF TECHNOLOGY

The following relates to a large slow-running two-stroke engine, for example marine diesel engine or gas or diesel engine in a power plant, with lubricant injector near the Top Dead Center (TDC) of the piston in the cylinder.

BACKGROUND

Due to the focus of on environmental protection, efforts are ongoing with respect reduction of emissions from marine engines. This also involves the steady optimization of lubrication systems for such engines. Thereto is added increased competition and the economic aspects of reducing oil consumption, as this is a significant part of the operational costs of ships. A further concern is proper lubrication despite reduced lubricant because the longevity of diesel engines should not be compromised by the reduction of oil consumption. Thus, there is a need for steady improvements with respect to lubrication.

For lubricating of large slow-running two-stroke marine diesel engines, several different systems exist, including injection of lubrication oil directly onto the cylinder liner or injection of oil quills to the piston surface.

An alternative method, commercially called Swirl Injection Principle (SIP), is relatively new and based on injection of a spray of atomized droplets of lubrication oil into the scavenging air swirl inside the cylinder. The helically upwards directed swirl results in the lubricant being pulled towards the Top Dead Centre (TDC) of the cylinder and pressed outwards against the cylinder wall as a thin and even layer. This is explained in detail in International Patent Application WO2010/149162. The lubricant injectors are non-return valves that comprise an injector housing inside which a reciprocating valve member is provided, typically a valve needle. The valve member, for example with a needle tip, in a valve housing closes and opens the lubricant's access to a nozzle aperture according to a precise timing. In current SIP systems, a spray with atomized droplets is achieved at a pressure of 35-40 bars, which is substantially higher that the oil pressure of less than 10 bars that are used for systems working with compact oil jets that are introduced into the cylinder. In some types of SIP valves, the high pressure of the lubrication oil is also used to move a spring-loaded valve member against the spring force away from the nozzle aperture such that the highly pressurised oil is released therefrom as atomized droplets. The ejection of oil leads to a lowering of the pressure of the oil inside the valve member, resulting in the valve member returning to its origin until the next lubricant cycle where highly pressurized lubrication oil is supplied to the lubricant injector again.

In such large marine engines, a number of injectors are arranged in a circle around the cylinder in a plane perpendicular to a cylinder axis and each injector comprises one or more nozzle apertures at the tip for delivering lubricant jets or sprays into the cylinder from each injector. Examples of SIP lubricant injector systems in marine engines are disclosed in international patent applications WO02/35068, WO2004/038189, WO2005/124112, WO2010/149162, WO2012/126480, WO2012/126473, and WO2014/048438, which are herewith incorporated by reference.

Traditionally, the cylinders of engines have been built with openings for oil injectors placed at a distance from the top dead centre (TDC) of the cylinder, where the distance about ⅓ or more of the total stroke of the cylinder. However, for increasing length of the cylinders, considerations apply whether the lubrication nozzles should be moved further towards the TDC in order to safeguard a proper lubrication in the cylinder near the TDC, where the heat is high and where the requirements for proper lubrication are most critical. For oil quills that are applied to the piston directly, such considerations have been disclosed by Miyake et al. in the article "PAPER NO.: 177 Cylinder liner and piston ring lubrication issues in relation to increase stroke/bore ratio", published by the International Council on Combustion Engines at the CIMAC Congress 2013 in Shanghai. In these experiments, it was found that the positioning of the lubrication valves at large distance of 1.2 m from the TDC resulted in the oil not being scraped into the combustion chamber. From the perspective of oil refreshment and neutralization of sulphuric acid in the combustion chamber, re-positioning of the lubrication valves closer to the TDC at 0.3 m was found advantageous, as 67% of the oil would be scraped into the combustion chamber. However, for overall lubrication of the entire cylinder, two-level lubrication improved the situation much with 20% of the oil scraped into the combustion chamber.

As compared to scraping of oil quills into the upper part of the cylinder, special considerations apply for SIP lubrication because part of the spray from the SIP valve nozzles is drawn helically upwards towards the TDC and into the combustion chamber and therefore provides a better lubrication even over a large distance from the SIP nozzles to the TDC. This is also why changing from quill scraping of oil to SIP lubrication has proven general improved conditions. For these reason also, it is generally not believed that a moving of the SIP injectors to a position closer to the TDC would yield any improvement that would justify the modification of cylinder liners. Especially, an improvement as it was found by Miyake et al. for the re-positioning of the oil quill lubrication valves cannot be expected. Thus, although, one may speculate in moving the quill nozzles or the jet nozzles of more traditional lubrication systems further towards the TDC, these considerations do not appear to apply for lubricant sprays of SIP lubrication principles due to the oil-transporting helical swirl.

However, despite these apparent advantages of SIP lubrication systems, a general steady motivation for improvements exists.

SUMMARY

An aspect relates to improving lubrication with SIP valves. It is a further aspect to reduce wear on the cylinder in a large slow-running two-stroke engine, especially in marine diesel engines. These aspects are achieved by a system and method for improved lubrication in a large slow-running two-stroke engine as described in detail in the following.

Although, the SIP lubrication principle, since its introduction, has been recognised as improvements over oil quill lubrication, because the spray is swirled towards the TDC and lubricates the combustion chamber, an even further recent improvement for lubrication was achieved experimentally in SIP lubrication by locating the SIP injectors closer to the TDC. Especially, much less wear than expected was found experimentally in the cylinder liner providing the SIP spray injectors at a relative distance from the TDC of ⅛ instead of ⅓ of the full stroke distance of the piston. During mechanical run-in, also called break-in, of an engine after replacement of the cylinder liner, it was found that the wear in the new liner was not larger than the wear in a cylinder that had been running for more than 1000 hours. This was utmost surprising, as the wear in the run-in period of an engine after change of a cylinder liner is very well known to be much larger than in the period following the running-in. Thus, despite the earlier general advantages and better performance of SIP lubrication as compared to other lubrication systems, a further improvement was possible.

Although, the experiments were performed with SIP injectors at a relative distance from the TDC of ⅛ of the full stroke, it is believed that the distance for improved SIP lubrication can be extended to ⅙ or even ⅕ of the full stroke, which is a position of the SIP injectors closer to the TDC than in traditional engines, where it is typically around ⅓ of the full stroke. Due to the fact that experiments take long time, experimental evidence has not yet been provided for the effect also being achieved at ⅙ and ⅕ relative distances, however, thorough technical considerations and first qualitative indications appear to support this.

The re-positioning of the SIP injectors relatively to the TDC can be achieved by correspondingly constructing cylinder liners from the onset with mounting holes close to the TDC or by adding new mounting holes to existing cylinder liners, where the new mounting holes are closer to the TDC than the original ones.

In those cases where reconstruction of a cylinder liner with injector mounting holes closer to the TDC is not possible, an improvement of SIP principles can also be achieved by changing the lubricant spray direction from the typical 0-20 degrees to a larger angle towards the TDC, in order to direct the spray from the SIP injectors towards the TDC or to a location on the cylinder liner closer to the TDC as compared to the location of the SIP valves, for example under an angle of more than 30 degrees, more than 45 degrees or even more than 60 degrees when measured from a plane normal to the cylinder axis.

The improvement by directing the spray towards the region close to the TDC is believed less efficient than the location of the spray injectors in that region, however, it can be a useful alternative if the lubricant injectors cannot be provided close enough to the TDC, for example due to constructional constraints around the cylinder liner. For optimization in some cases, the two described methods of positioning the injectors close to the TDC and the spraying towards the TDC can be combined, if this is found advantageous.

The term large slow-running two-stroke engine is meant for engines that have a size that is typically used for ships and power plants, for example with a cylinder diameter of more than 30 cm or even more than 100 cm. Typical engines of concern are diesel engines, although also gas driven engines can be used. Special use of the lubrication system and method is for large slow-running two-stroke diesel engine in ships.

Such an engine comprises a plurality of cylinders, each with a piston inside, the piston reciprocating along a longitudinal cylinder axis between a top dead centre, TDC, and a bottom dead centre, BDC, the distance between the TDC and the BDC corresponding to a full stroke. The cylinder comprises a plurality of lubricant injectors distributed along a perimeter of the cylinder, for example with identical angular distance, between the TDC and the BDC for injection of lubricant into the cylinder at various positions on the perimeter; wherein each lubricant injector comprises a spray nozzle with an aperture for ejecting a spray. Most lubricant injectors only have one aperture in the nozzle, although the spray nozzle may also be provided with multiple apertures. The direction of the spray is defined as an average direction of the droplets in the spray. In some embodiments, the atomised spray, also called mist, from a first nozzle is directed towards the cylinder liner into the region between the first nozzle and the next nozzle on the perimeter.

The lubricant injectors are functionally connected to a control system that is configured for providing lubrication oil at a predetermined lubricant pressure to the lubricant injectors through a corresponding pipe system and which is configured for controlling the timing of injection of lubricant into the cylinder. The timing, in turn, is linked to the revolutions of the engine, for example with one injection per revolution or one injection for each second revolution. The timing of the injection is determined by periodic increased pressure of the oil that is supplied to the lubricant injectors. For example, the injection is performed, once the oil pressure exceeds a certain predetermined threshold inside the lubricant injector.

For the SIP principle, each of the lubricant injectors is provided with a nozzle extending into the cylinder. The nozzle is dimensioned to provide sprays with atomized droplets of lubrication oil, also called mist of oil, when being provided with lubrication oil at the predetermined threshold lubricant pressure.

The control system is also configured for causing the lubricant injectors to inject the spray into scavenging air in the cylinder prior to the piston passing the lubricant injectors in its movement towards the TDC for diffusing the atomized droplets in the scavenging air and distributing the atomized droplets onto the cylinder wall by transport of the atomized droplets in a direction towards the TDC utilising a swirling motion of the scavenging air towards the TDC.

In particular, the nozzles of the lubricant injectors in the cylinder are located at a first specific distance from the TDC, the first specific distance being less than or equal to a fraction of the full stroke of the piston, the fraction being ⅕. For example, the first specific distance is less than ⅙, 1/7, or ⅛ of the full stroke.

In order to provide a proper SIP lubrication during running of the engine, sprays with atomized droplets of lubrication oil are repeatedly injected into scavenging air in the cylinder by the lubricant injectors prior to the piston passing the lubricant injectors in its movement towards the TDC. In the scavenging air, the atomized droplets are diffused and distributed onto the cylinder wall, as they are transported in a direction towards the TDC due to a swirling motion of the scavenging air towards the TDC.

The atomization of the spray is due to highly pressurized lubrication oil in the lubricant injector at the nozzle. The pressure is higher than 10 bars, typically between 25 bar and 100 bar for this high pressure injection. An example is an interval of between 30 and 80 bars, optionally between 35 and 50 bars.

For example, the lubricant injectors comprise a spray nozzle having aperture of between 0.1 and 1 mm, for example between 0.2 and 0.5 mm, for ejecting the spray or atomized droplets, also called mist of oil.

Also, the viscosity influences the atomization. Lubrication oils used in marine engine, such as such as ExxonMobil® Mobilgard™ 560VS, have a typical kinematic viscosity of about 220 cSt at 40° C. and 20 cSt at 100° C., which translates into a dynamic viscosity of between 202 and 37 mPa·s. Other lubrication oils used for marine engines are other Mobilgard™ oils as well as Castrol® Cyltech oils, which have largely the same viscosity in the range of 40-100° C. and are all useful for atomization, for example when having a nozzle aperture diameter of 0.1-0.8 mm, and the lubrication oil has a pressure of 30-80 bars at the aperture and a temperature in the region of 30-100° C. or 40-100° C.

Typical for SIP lubrication is that the oil is not injected in a radial direction, which is a direction from the cylinder liner towards the central cylinder axis. Instead, the nozzle aperture of the lubricant injector is directed towards the cylinder wall at a spray direction that has a tangential component that is larger than a radial component. The radial component is parallel to a direction from the lubricant injector towards the cylinder axis at the centre of the cylinder; and the tangential component is parallel to a direction tangential to the cylinder. For example, the atomised spray from a first nozzle is directed towards the cylinder liner into the region between the first nozzle and the next nozzle on the perimeter. Often, the nozzles are arranged with identical angular distance between the nozzle around the cylinder in a plane normal to the cylinder axis.

In order not to prevent the propagation of the spray from being hindered in this direction by the material from the cylinder liner, the cylinder liner advantageously comprises a groove for each lubricant injector, the groove extending from the nozzle aperture along the spray direction.

Although, new cylinder liners can be provided with mounting holes for lubricant injectors, where the mounting holes are provided at the first specific distance from the TDC from the onset, the system is also useful for retrofit of injectors, where additional mounting holes are established, for example by drilling the mounting holes through into the cylinder liner closer to the TDC than the original mounting holes. Optionally, the original mounting holes at a larger distance and the additional holes closer to the TDC can both be used for mounting of lubricant injectors, although, often, the mounting holes at the larger distance from the TDS would be blinded and not used for lubrication.

For example, the cylinder is provided with a first set of mounting holes for lubricant injectors at a particular distance from the TDC, the particular distance being more than ⅕ of the full stroke, for example more than ¼ or more than ⅓ of the full stroke. The cylinder is then modified by establishing a second set of mounting holes in the cylinder at a first specific distance from the TDC which is less than or equal to a ⅕ of the full stroke, for example less than or equal to ⅙ of the full stroke or less than or equal to ⅐ or less than or equal to ⅛ of the full stroke. Lubricant injectors are then mounted in the second set of mounting holes, and using the second set of mounting holes for the spray injection. Typically, however, a distance closer than ⅛ of the full stroke is not necessary.

In some practical embodiments, the lubricant injector comprises an injector housing with a nozzle tip at one end of the injector housing for reaching into the cylinder when the injector housing is mounted in the cylinder wall. For example, the nozzle tip is an integral part of the injector housing, but this is not always the case. If the cylinder liner is provided with a groove for the spray, the nozzle tip reaches into the groove. The nozzle tip comprises an aperture, extending from an inner cavity inside the injector housing and through a wall of the nozzle tip for ejection of pressurised lubrication oil from the inner cavity and out of the injector housing through the aperture. Inside the injector housing, there is mounted a valve member reciprocally sliding between an open and closed state of the injector. The valve member is sealingly covering the aperture of the nozzle when in the closed state for preventing access of lubrication oil to the aperture. The valve member is moved away from the aperture of the nozzle during an open state for giving access of the lubrication oil from the inner cavity to the aperture during an oil ejection phase out of the aperture of the nozzle. The release of lubricant is stopped by subsequent decrease of pressure in the chamber. The reciprocation of the valve member is done repeatedly with a proper timing in accordance with the movement of the piston.

For example, the lubricant injector receives lubrication oil from the control system into the inner cavity of the lubricant injector at a predetermined pressure. The inner cavity is provided between the nozzle and the valve member such that moving of the valve member away from the nozzle aperture increases the volume of the inner chamber. When pressurised oil enters the inner chamber, it presses against the valve member, for example against a shoulder of the valve member, for increasing the volume of the inner chamber, and increased pressure above a predetermined threshold pressure causes the valve member to be displaced from the nozzle aperture, giving way for release of the lubrication oil from the inner cavity through the aperture of the nozzle. In order to provide a high pressure inside the inner cavity, advantageously, the valve member is pre-stressed by a spring towards a position where it covers and closes the aperture of the nozzle. For each repeated lubrication cycle, the lubrication oil is pumped into the inner cavity at high pressure, for example at a pressure between 25 and 100 bars, typically between 30 and 80 bars, and moves the valve member away from the aperture. For example, the valve member has a shoulder against which the pressurised lubrication oil is pressing in order to increase the volume of the inner cavity and expel the lubrication oil out of the nozzle, once the pressure of the lubrication oil against the valve member is larger than the pressure on the valve member by the spring. In this case, the spring pressure determines the threshold pressure for spray ejection An example of an alternative method for moving the valve member is an electromechanical system, for example a solenoid moving a magnetically responsive core or shell that is connected to the valve member. The valve member would then only be moved when the oil pressure is sufficiently high for the aperture to provide the atomized spray.

Example for a spray injector in relation to the SIP principle is described in the above-mentioned patent applications WO02/35068, WO2004/038189, WO2012/126480, WO2012/126473, and WO2014/048438. A lubrication control system is explained in detail in International Patent Application WO2010/149162. These disclosures are herewith incorporated by reference.

In case that the cylinder liner cannot be provided with mounting holes for injectors as close as the first specific distance, for example because a cooling cap is preventing access for mounting or because there are provided cooling channels inside the cylinder liner that would be broken in a retrofit, a different method as mentioned above and as described in more detail in the following can be used. This method is not regarded as efficient as the provision of lubricant injectors close to the TDC. However, relatively to the prior art, it would provide improved lubrication. In coarse terms, the following method is a SIP lubrication method where the lubricant spray direction is changed from the typical 0-20 degrees to a larger angle towards the TDC, the angle being larger than 30 degrees, for example larger than 45 degrees or even larger than 60 degrees. The angle is measured from a plane normal to the cylinder axis. For example, this angle is in the range 30-80 degrees, optionally 45-80 degrees or 60-80 degrees.

By changing the spray direction towards the TDC, the lubrication oil is easier transported towards the TDC by the swirl. In other words, the increased inclination of the spray assists the swirl in the transportation of the oil towards the TDC and into the combustion chamber.

Typically, when mounting the lubrication injectors close to the TDC, such highly inclined spray direction towards the TDC is not necessary. However, in principle, a higher inclined spray direction than 20 degrees may be combined with the mounting of the lubricant injectors close to the TDC as described above.

For example, the lubricant injectors are provided at a particular distance from the TDC, the particular distance being more than ⅕ of the full stroke of the piston, for example more than ¼ of the full stroke. In many engines, the lubricant injectors are provided at a distance from the TDC of around ⅓ of the full stroke or more. The lubricant injectors are then mounted with a spray direction toward a region on the cylinder liner, the region being located between the TDC and a first specific distance from the TDC, the first specific distance being less than ⅕ of the full stroke of the piston, for example less than or equal to ⅙, ⅐ or ⅛ of the full stroke.

For example, the spray direction is directed towards the cylinder wall and has a tangential component that is larger than a radial component, wherein the radial component is parallel to a direction from the lubricant injector towards a center axis of the cylinder and the tangential component is parallel to a direction tangential to the cylinder. In relation to the angle for the spray direction, the cylinder liner is potentially adjusted with corresponding grooves through which the spray can propagate largely unhindered from the nozzle of the lubricant injector into the cylinder in the spray direction.

The term spray is used herein as a term for an atomized ejection of lubricant, also termed mist of oil. The term lubricant is used for lubrication oil, different from diesel oil, especially due to its much higher viscosity, despite the diesel oil also having some degree of lubrication properties.

In order for the spray to not be directed radially into the cylinder by a first nozzle but rather quasi-tangentially, which means under a small angle with the tangent, in order to spray oil on the cylinder liner between the first nozzle and the next nozzle on the perimeter, the liner is provided with grooves through which the spray can propagate into the cylinder on a quasi-tangential path. In the case, where the direction of the spray is directed towards the region near the TDC, it is advantageous to provide grooves in the cylinder liner that unhindered allows propagation of the spray in such direction. For example, the groove is semispherical for allowing free adjustment of the spray direction without hindering the propagation of the spray in the adjusted direction.

The tangential component of the spray direction assists the swirl in accelerating the oil mist in a helical movement towards the TDC. However, in principle, a radial injection is also possible with an angle towards the TDC as described above.

In summary, an improvement for lubrication is achieved in SIP lubrication by locating the SIP injectors closer to the TDC than a fraction of the full stroke of the piston, where the fraction is less than ⅕, for example less than or equal to ⅛. This is closer to the TDC than in traditional engines.

This can be achieved by reconstructing cylinder liners or by adding new mounting holes to the cylinder. In case that such reconstruction is not possible, an improvement of SIP principles can also be achieved by directing the spray towards the TDC or towards a location closer to the TDC as compared to the location of the SIP valves, for example under an angle of more than 30 degrees, more than 45 degrees or more than 60 degrees when measured from a plane normal to the cylinder axis. Also, the two described methods can be combined.

BRIEF DESCRIPTION

Some of the embodiments will be described in detail, with references to the following Figures, wherein like designations denote like members, wherein.

DETAILED DESCRIPTION

Figure 1A:
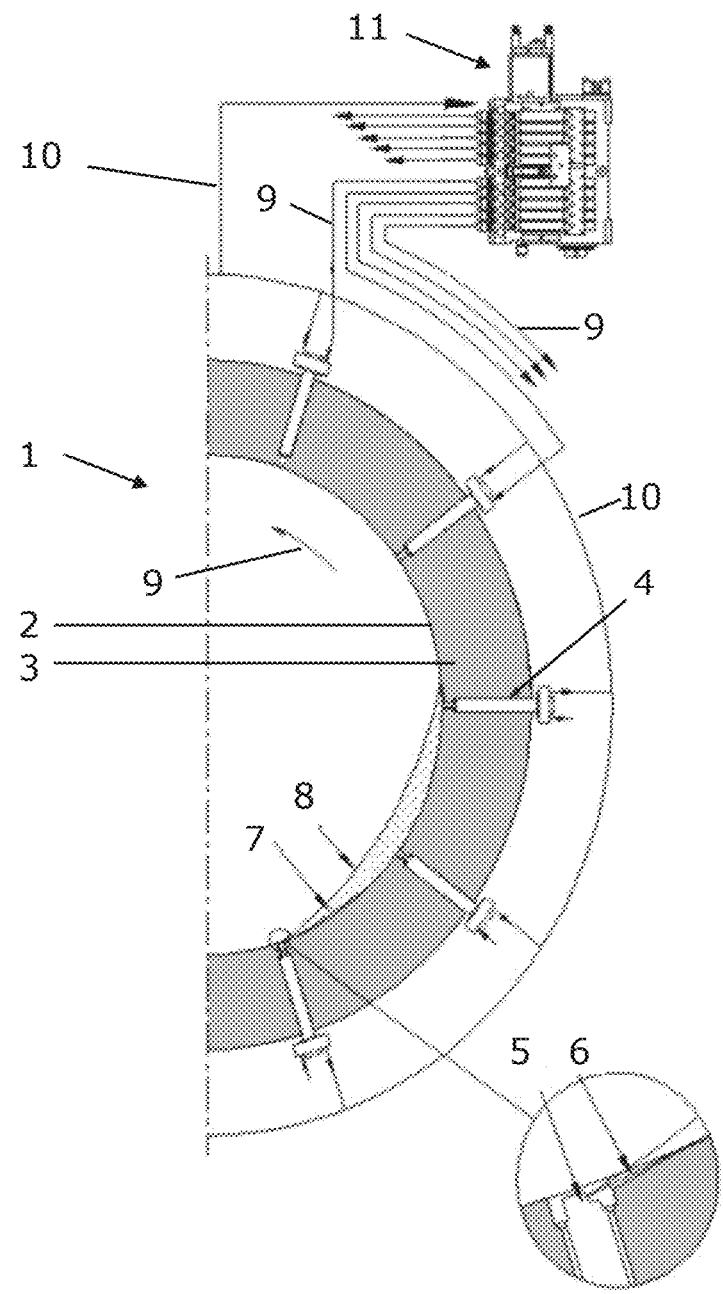
FIG. 1a illustrates a top view of a cylinder lubrication system in a large slow-running two-stroke engine, for example a marine diesel engine.

FIG. 1a illustrates one half of a cylinder of a large slow-running two-stroke engine, for example marine diesel engine. The cylinder 1 comprises a cylinder liner 2 on the inner side of the cylinder wall 3. Inside the cylinder wall 3, there are provided a plurality of lubricant injectors 4 distributed along a circle with identical angular distance between adjacent injectors 4. The injectors 4 receive lubrication oil from a lubricator pump and controller system 11 through lubrication supply lines 9. The supplied oil is typically heated to a specific temperature, for example 50-60 degrees. Some of the lubricant is returned to the pump by lubricant return lines 10. The lubricator pump and controller system 11 supplies pressurised lubrication oil to the injectors 4 in precisely timed pulses, synchronised with the piston motion in the cylinder 1 of the engine. For the synchronisation, the lubricator pump and controller system 11 comprises a computer that monitors parameters for the actual state and motion of the engine, including speed, load, and position of the crankshaft, as the latter reveals the position of the pistons in the cylinders.

Each of the injectors 4 has a nozzle 5 with an aperture from which an atomized spray 7 of lubrication oil, also called oil mist, is ejected under high pressure into the cylinder 1. For example, the nozzle aperture has a diameter of between 0.1 and 0.8 mm, such as between 0.2 and 0.5 mm, which at a pressure of 10-100 bars, for example 25 to 100 bars, or typically 30 to 80 bars, atomizes the lubricant into a fine spray, which in in contrast to a compact jet of lubricant. The swirl 9 of the scavenging air in the cylinder 1 presses the spray 8 against the cylinder liner 2 such that an even distribution of lubrication oil on the cylinder liner 2 is achieved. This lubrication system is known in the field as Swirl Injection Principle, SIP. Typically, the cylinder liner 2 is provided with grooves 6 for providing adequate space for propagation of the spray from the injector in a non-radial way, as illustrated, where the direction is along the cylinder wall for lubricating the region between two adjacent nozzles, or even longer, as illustrated, assisting the transportation of the lubrication oil by the swirl.

Figure 1B:
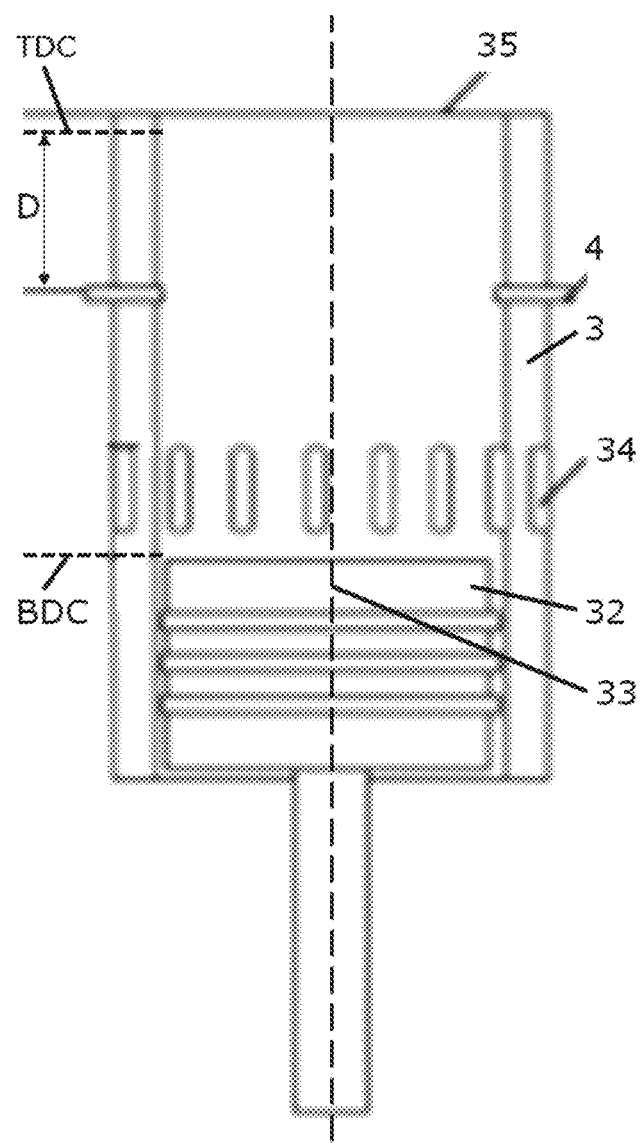
FIG. 1b illustrates a side view of a cylinder lubrication system in a large slow-running two-stroke engine, for example marine diesel engine.
Figure 1C:
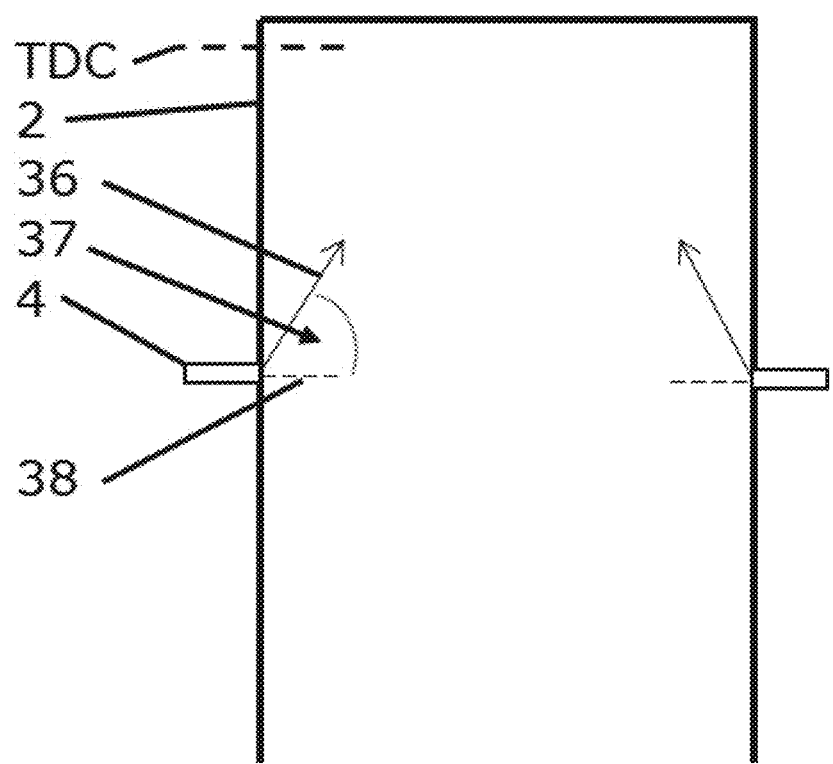
FIG. 1c illustrates a cylinder lubrication system in a large slow-running two-stroke engine, for example marine diesel engine.

In FIG. 1*b*, a schematic drawing is shown of a cylinder 2 inside which a piston 32 is reciprocating along a central cylinder axis 33 between a bottom dead centre, BDC, and a top dead centre, TDC, the top dead centre being slightly below the cylinder top 35. The distance D of the lubricant injector from the TDC can be expressed in terms of length from the TDC or, alternatively, as is done herein in terms of fraction of the full stroke, which is the distance between the TDC and the BDC.

Figure 2A:
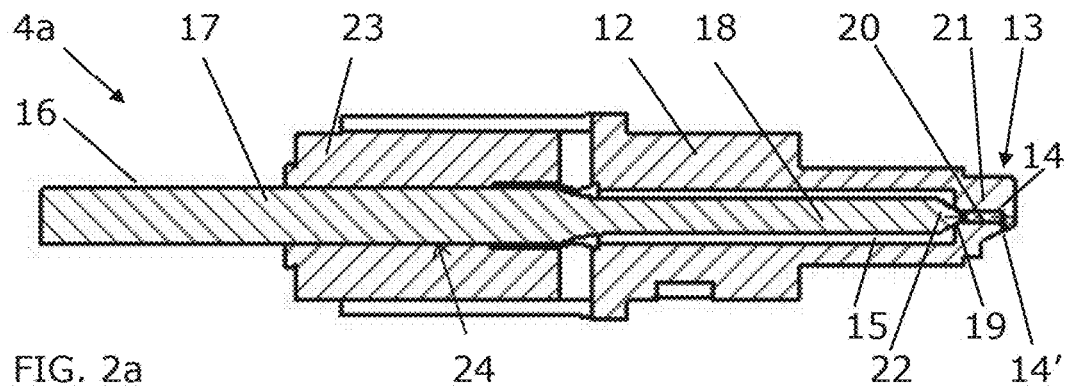
FIG. 2a shows a first type of an injector.

FIG. 2*a* illustrates a first type 4*a* of lubrication oil injector. The generalized principle of the injector is similar to the ones disclosed in WO02/35068, WO2004/038189 or WO2005/124212 for a single nozzle aperture or as disclosed in WO2012/126480 for multiple nozzle apertures. These references also provide additional technical details as well as explanations to the functioning of the injectors presented here, which are not repeated here, for convenience.

The injector 4*a* comprises an injector housing 12 having a nozzle tip 13 which is integral with the injector housing 12 at one end. A nozzle 14 with a nozzle aperture 14' is provided in the nozzle tip 13 for ejection of lubrication oil. The nozzle 14 also comprises a duct 20 that extends from the nozzle aperture 14' through the wall 21 of the nozzle tip 13 into a cylindrical inner cavity 15 of the injector housing 12. A valve member 16 is provided inside the injector housing 12. The valve member 16 comprises a stem 17 that is slidingly guided for reciprocation inside a plain bearing 23, which in the shown embodiment is a separate stationary part inside the injector housing 12, although it could also be part of the injector housing 12, itself. As a coaxial longitudinal extension of the stem 17, a valve needle 18 is provided in the inner cavity 15 of the injector housing 12. The valve needle 18 has a diameter that is smaller than the diameter of the inner cavity 15 such that lubrication can flow along the valve needle 18 and to the duct 20 and out of the nozzle aperture 14' when a needle tip 22, for example a conical end part, at the end of the valve needle 18 is retracted from a valve seat 19 at a second end of the duct 14 such that the duct 20 is open for flow of lubricant to the nozzle aperture 14' from where it is ejected. The position of the valve member 16 and the valve needle 18 is pre-stressed by the nozzle tip 13 by moderate spring pressure acting on the opposite end of the valve member 16; and the valve member 16 with the valve needle 18 is offset backwards away from the seat 19 by increase of oil pressure in the cavity 15. The ejection of oil occurs when the displacement of the valve member 16 by the oil pressure overcomes the pre-stressed force from the spring. In this way, the spring force regulates the pressure of the ejected oil. This is explained in greater detail in the prior art references cited herein.

Figure 2B:
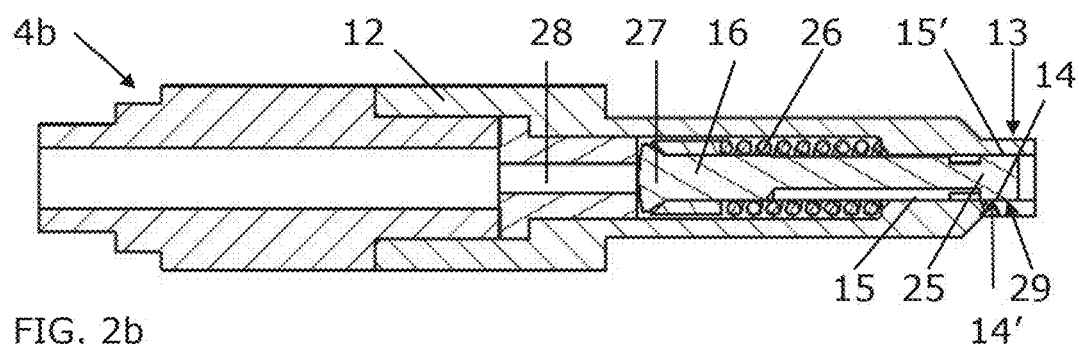
FIG. 2b shows a second type of an injector.

FIG. 2*b* illustrates a second type 4*b* of lubrication oil injector. The generalised principle of the injector is similar to the one disclosed in WO2014/048438. This reference also provides additional technical details as well as explanations to the functioning of the injector presented here, which are not repeated here, for convenience.

The injector 4*b* comprises an injector housing 12 having a nozzle tip 13 which is integral with the injector housing 12 at one end thereof. A nozzle aperture 14' is provided in the nozzle tip 13 for ejection of lubrication oil. Inside a cavity 15 of the injector housing 12, a valve member 16 is provided, the valve member 16 comprising a stem 17 and a cylindrical sealing head 25 which is arranged slidingly in a cylindrical cavity part 15' at the nozzle tip 13 of the injector housing 12. The position of the valve member 16 is pre-stressed backwards away from the nozzle tip 13 by a spring 26 and is offset forwards by oil pressure acting through a channel 28 upon the back part 27 of the stem, the oil pressure acting against the spring 26 force. The nozzle aperture 14' is sealingly covered by the sealing head 25 which abuts the cylindrical cavity part 15' at the nozzle tip 13, unless the valve member 16 is pushed forward such that the sealing head 25 slides pass and away from the nozzle aperture 14' to allow lubricant oil to flow from the inner cavity 15 through the nozzle aperture 14' for ejection.

Figure 2C:
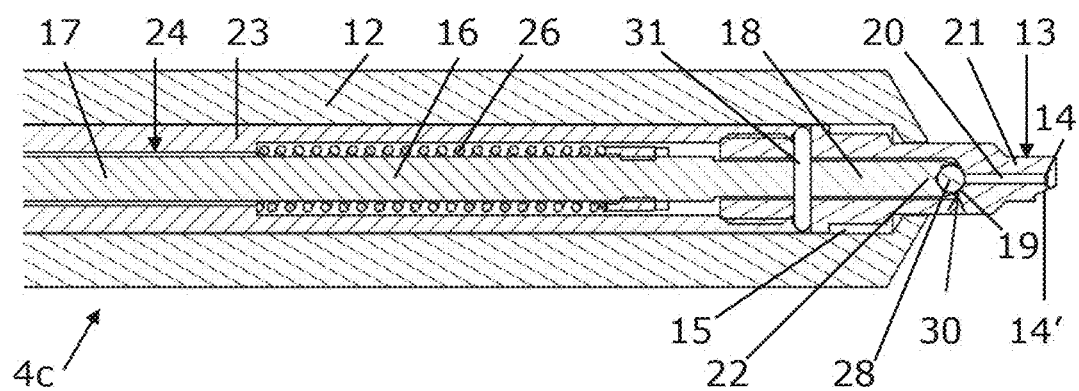
FIG. 2c shows a third type of an injector.

FIG. 2*c* illustrates a third type 4*c* of lubrication oil injector. The generalised principle of the injector is similar to the one disclosed in WO2012/126473. This reference also provides additional technical details as well as explanations to the functioning of the injectors presented here, which are not repeated here, for convenience.

The injector 42 comprises an injector housing 12 having a nozzle tip 13, at which a nozzle 14 is provided with a duct 20 and a nozzle aperture 14' at a first end of the duct 20. The duct 20 extends from the nozzle aperture 14' through the wall 21 of the nozzle tip 13 into the inner cavity 15 of the injector housing 12. Inside the cavity 15 of the injector housing 12, a valve member 16 is provided, the valve member 16 comprising a stem 17 that is slidingly guided for reciprocation inside a plain bearing 23, which in the embodiment is shown as a separate stationary part inside the injector housing, although it could also be part of the injector housing 12 itself. The position of the valve member 16 is pre-stressed forward towards the nozzle tip 13 by a spring 26. One possible retraction mechanism is disclosed in WO2012/126473 in which an electrical coil exerts an electromagnetic force on the valve member, which is equipped with a correspondingly electromagnetic responsive part. However, in principle, it is also possible by suitable construction that the valve member 16 is offset backwards by increased oil pressure in the cavity 15 acting on the valve member 16 against the spring 26 force. As a coaxial longitudinal extension of the stem 17, the valve member 16 comprises a valve needle 18 to which there is fastened a sealing ball member 28 as part of a needle tip 22, which in closed valve conditions is pressed against the seat valve 19 for closure of the duct 20 and which in open valve conditions is offset from the seat 19 a distance to allow lubrication oil to pass from the inner cavity 15 pass the needle tip 22 with the ball 28 and into the duct 20 and out of the nozzle aperture 14'. By an O-ring 31, the inner cavity 15 is sealed backwards towards the remaining parts inside the injector housing 12.

Figure 3:
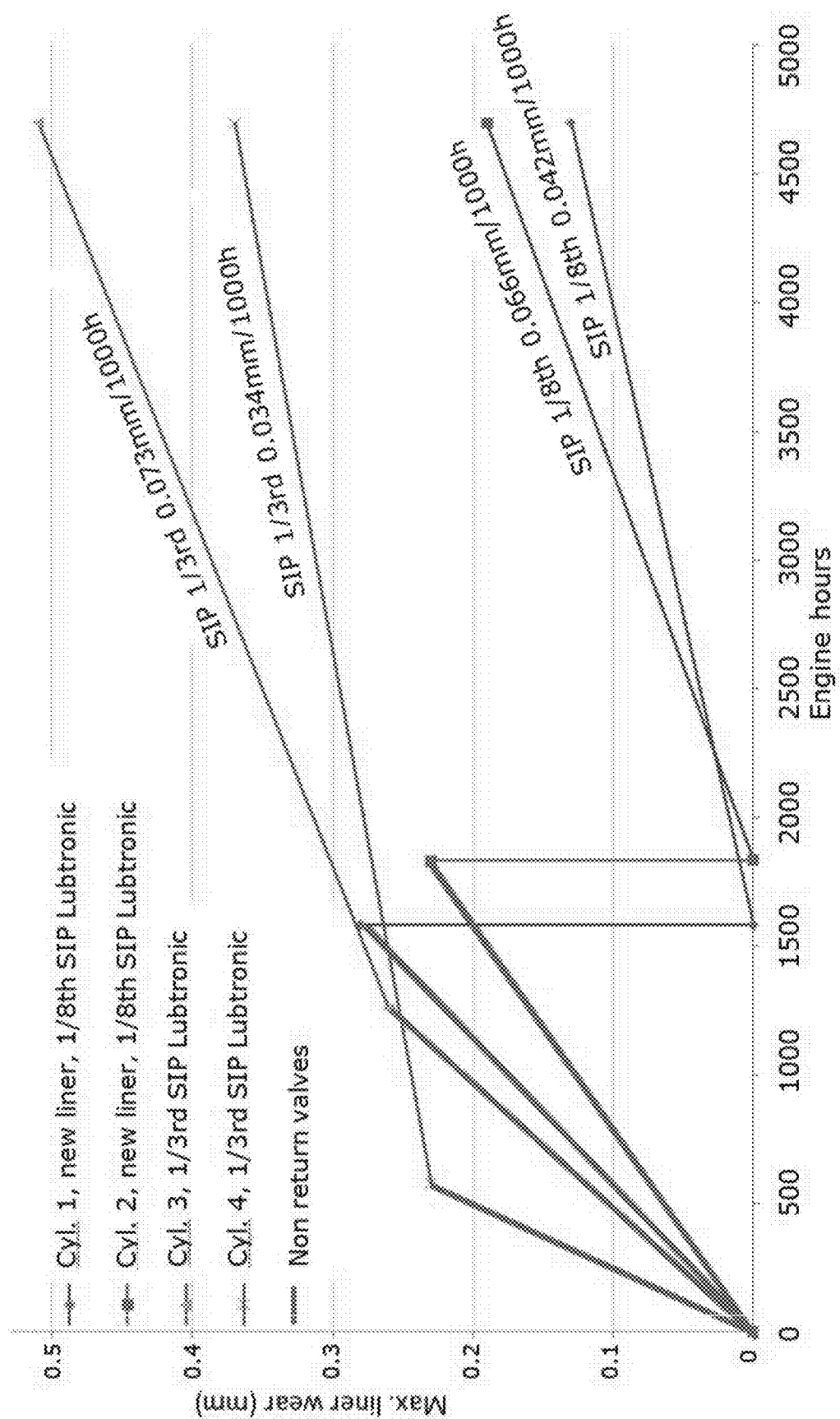
FIG. 3 shows experimental data for an engine in which two cylinders were amended to lubricant injectors closer to the TDC.

Typical dimensions for the injector housings are 10-30 mm in diameter and 50-130 mm in length, although, the injector including the back end where the supply lines are connected can be somewhat longer. The valve member 16 has a typical length of 40-80 mm and a diameter of 5-7 mm at the stem and a smaller diameter for the valve needle 18. The housing tip 13 has a typical diameter of 6-10 mm, depending on the overall size of the injector housing 12. Nozzle apertures 14' have a diameter within the range of 0.1 to 1 mm, for example within the range of 0.2 mm to 0.7 mm FIG. 3 illustrates measurements on a marine diesel engine of the type 9S90ME-C9.2-TII produced by MAN B&W®. The maximum liner wear was measured for four cylinders. In a first cylinder, Cyl. 1, and a second cylinder, Cyl. 2, the liner was changed after 1600 and 1800 hours of running, respectively, to a new liner of a similar type, however, with mounting holes for the injectors provided at a distance from the TDC of about ⅛ of the full stroke, and a SIP injector connected to a HJL Lubtronic™ system was installed. In a third cylinder, Cyl. 3, and further cylinder, Cyl. 4, after 1200 and 500 hours of running, respectively, with a traditional non-return valve, SIP injectors were installed.

All SIP injectors were fed with lubrication oil from a HJL Lubtronic™ system. The HJ Lubtronic™ system is an electronically controlled, hydraulic lubricator with load dependent lubrication for reduced cylinder oil consumption and optimised cylinder conditions, delivering fresh cylinder oil with every piston stroke. The HJ Lubtronic™ system is based on an electronically controlled cylinder lubricator at each cylinder, which is operated electronically by a local controller, receiving information about synchronization of the system with the engine flywheel rotation and using engine load information as a control parameter for the system. Control of each individual cylinder lubricator is possible.

When comparing the curves in FIG. 3 before and after the change, it is seen from the graphs that the slopes different, which expresses different speeds of wear. The speed of wear was respectively, around 0.08 mm/1000 hrs for the non-return valves whereas it was around 0.03 mm/1000 hrs for the SIP Lubtronic™® injection system.

As also seen in FIG. 3, the SIP valves at a distance of ⅛ and the SIP valves at ⅓ show largely the same speed of wear. This is an utmost surprising result because the wear during the first period of running should be much higher than for cylinder liners that are beyond the run-in period. The latter is common knowledge in the field and also described on page 5 in the document by MAN® called Service Letter SL2014-587/JAP. As the wear on new liners with the injectors at ⅛ stroke during the run-in phase was much lower than expected, even lower than could be expected with SIP injectors positioned from the TDC at ⅓ of the stroke, the use of a SIP system with spray injectors at a distance form TDC of ⅛ instead of ⅓ of the stroke can be interpreted as providing a much better lubrication. The surprise stems from the fact that it was generally believed in the field that the scavenging air would efficiently distribute the lubricant along the liner all the way up to the TDC. However, these experimental results, as illustrated in FIG. 3 proof differently in that a positioning of the lubricant injectors at a distance from the TDC of ⅛ instead of ⅓ yield a lower wear and thus, better lubrication near the TDC.

Although, the experiments have been performed with a distance from the TDC at ⅛ (0.125), of the full stroke, it is reasonable to believe that the effect is pronounced until a value of ⅐ or ⅙ or even ⅕ (=0.20) of the full stroke, whereas a surprisingly improved effect as compared to various earlier measurements with SIP injectors in marine diesel engines has not been observed for a distance of ⅓ of the full stroke.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for lubricating a large slow-running two-stroke engine, the engine comprising a cylinder with a piston inside, the piston reciprocating along a longitudinal cylinder axis between a top dead centre, TDC, and a bottom dead centre, BDC, the distance between the TDC and the BDC corresponding to a full stroke; the cylinder being provided with a plurality of lubricant injectors distributed along a perimeter of the cylinder between the TDC and the BDC for injection of lubricant into the cylinder at various positions on the perimeter; wherein the method comprises:

providing the lubricant injectors with only one spray nozzle having an aperture for ejecting a spray in a spray direction, which is an average direction of droplets in the spray; during running of the engine, repeatedly injecting sprays with atomized droplets of lubrication oil into scavenging air in the cylinder by the lubricant injectors prior to the piston passing the lubricant injectors in its movement towards the TDC, providing the lubrication oil to the lubricant injectors at a pressure of between 25 bar and 100 bar for high pressure injection, and diffusing the atomized droplets in the scavenging air and distributing the atomized droplets onto the cylinder wall by transporting the atomized droplets in a direction towards the TDC utilising a swirling motion of the scavenging air towards the TDC; providing the lubricant injectors in the cylinder at a first specific distance D from the TDC, wherein the first specific distance is equal or less than ⅕ of the full stroke of the piston.

2. The method according to claim 1, wherein the first specific distance D is equal or less than ⅙ of the full stroke of the piston.

3. The method according to claim 1, wherein the first specific distance D is equal or less than ⅛ of the full stroke of the piston.

4. The method according to claim 1, wherein the method comprises providing the lubricant injectors with a spray nozzle having an aperture for ejecting the spray, the aperture having a diameter of between 0.1 and 0.8 mm.

5. The method according to claim 1, wherein the method comprises, providing a cylinder liner grooves through which the spray can propagate largely unhindered from the nozzle of the lubricant injectors into the cylinder in the spray direction which is directed towards the cylinder wall and wherein the spray direction has a tangential component that is larger than a radial component, wherein the radial component is parallel to a direction from the lubricant injectors towards a central axis of the cylinder and the tangential component is parallel to a direction tangential to the cylinder.

6. The method according to claim 1, wherein the method is a retrofit of lubricant injectors closer to the TDC and comprises, providing the cylinder with a first set of mounting holes for lubricant injectors at a particular distance from the TDC, the particular distance being more than a fraction of ⅕ of the full stroke, and modifying the cylinder by establishing a second set of mounting holes in the cylinder at a first specific distance D from the TDS which is less than a fraction of ⅕ of the full stroke; mounting the lubricant injectors in the second set of mounting holes, and using the second set of mounting holes for the spray injection.

7. The method according to claim 6, the method further comprising blinding the first set of mounting holes and only using the second set of mounting holes for the lubricant injectors.

8. A use of a method according to claim 1 for lubricating a large slow-running two-stroke marine diesel engine.

9. A system for lubricating a large slow-running two-stroke engine, the engine comprising a cylinder with a piston inside, the piston reciprocating along a longitudinal cylinder axis between a top dead centre, TDC, and a bottom dead centre, BDC, the distance between the TDC and the BDC corresponding to a full stroke; the cylinder comprising a plurality of lubricant injectors distributed along a perimeter of the cylinder between the TDC and the BDC for injection of lubricant into the cylinder at various positions on the perimeter; wherein the lubricant injectors comprise a spray nozzle having an aperture for ejecting a spray in a spray direction, which is an average direction of the droplets in the spray; the lubricant injectors being functionally connected to a control system that is configured for providing lubrication oil at a predetermined lubricant pressure to the lubricant injectors and configured for controlling the timing of injection of lubricant into the cylinder; the lubricant injectors being provided with a nozzle extending into the cylinder, the nozzle having a nozzle aperture dimensioned to provide sprays with atomized droplets of lubrication oil when being provided with lubrication oil at the predetermined lubricant pressure where the predetermined oil pressure is between 25 bar and 100 bar; the control system being configured for causing the lubricant injectors to inject the spray into scavenging air in the cylinder prior to the piston passing the lubricant injectors in its movement towards the TDC for diffusing the atomized droplets in the scavenging air and distributing the atomized droplets onto the cylinder wall by transport of the atomized droplets in a direction towards the TDC utilising a swirling motion of the scavenging air towards the TDC; wherein the nozzles of the lubricant injectors in the cylinder are located at a first specific distance D from the TDC, the first specific distance being equal to or less than ⅕ of the full stroke of the piston.

10. The system according to claim 9, wherein the first specific distance D is equal or less than ⅙ of the full stroke of the piston.

11. The system according to claim 10, wherein the first specific distance D is equal or less than ⅛ of the full stroke of the piston.

12. The system according to claim 9, wherein the lubricant injectors comprise the spray nozzle having aperture of between 0.1 and 0.8 mm for ejecting the spray.

13. The system according to claim 9, wherein the lubricant injectors comprise the nozzle with an aperture that is directed towards the cylinder wall for providing a spray direction with a tangential component that is larger than a radial component, wherein the radial component is parallel to a direction from the lubricant injector towards the central axis of the cylinder and the tangential component is parallel to a direction tangential to the cylinder, wherein a cylinder liner comprises a groove for each lubricant injector, the groove extending from the nozzle aperture along the spray direction for the spray propagating largely unhindered from the nozzle aperture along the spray direction on a path that is directed towards the cylinder wall.

14. The system according to claim 9, wherein the lubricant injector comprise an injector housing; the injector housing comprising a nozzle tip at one end of the injector housing for reaching into the groove when the injector housing is mounted in the cylinder wall; wherein a spray nozzle with an aperture is provided in the nozzle tip, the aperture of the nozzle extending from an inner cavity inside the injector housing and through a wall of the nozzle tip for ejection of lubricant from the inner cavity out of the injector housing through the aperture of the nozzle; wherein a valve member is provided inside the injector housing, the valve member being mounted reciprocal between an open and closed state of the injector; the valve member sealingly covering the aperture of the nozzle when in the closed state for preventing access of lubrication oil to the aperture, and the valve member being movable away from the aperture during an open state for giving access of the lubrication oil from the inner cavity to the aperture of the nozzle during an oil ejection phase out of the aperture.

15. The system according to claim 14, wherein the valve member is pre-stressed by a spring to cover the aperture the nozzle, wherein the lubricant injectors are configured for receiving lubricant from the control system via a pipe system into the inner cavity at a variable pressure for repeatedly moving the valve member away from the aperture by correspondingly repeated increasing of the pressure of the lubrication oil in the inner cavity and give way for release of the lubrication oil from the inner cavity through the aperture of the nozzle.

16. A large slow slow-running two-stroke marine diesel engine with a system according to claim 9 for lubricating the engine.

* * * * *

UNITED STATES PATENT AND TRADEMARK OFFICE
CERTIFICATE OF CORRECTION

PATENT NO. : 10,731,527 B2
APPLICATION NO. : 15/770903
DATED : August 4, 2020
INVENTOR(S) : Nick Paw Bennedsen Page 1 of 1

It is certified that error appears in the above-identified patent and that said Letters Patent is hereby corrected as shown below:

In the Claims
Column 14, Line 12, Claim 14 delete "injector comprise" and insert -- injectors comprise --

Signed and Sealed this
Sixth Day of October, 2020

Andrei Iancu
*Director of the United States Patent and Trademark Office*